(12) United States Patent
Weidemann et al.

(10) Patent No.: US 10,195,939 B2
(45) Date of Patent: Feb. 5, 2019

(54) METHOD FOR OPERATING A MULTI-AXLE DRIVE TRAIN FOR A MOTOR VEHICLE, AND CORRESPONDING MULTI-AXLE DRIVE TRAIN

(71) Applicant: AUDI AG, Ingolstadt (DE)

(72) Inventors: Dieter Weidemann, Stammham (DE); Heiko Hanickel, Kipfenberg (DE); Florian Kolb, Gößweinstein (DE); Hans Jörg Brühl, Kösching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/523,959

(22) PCT Filed: Nov. 5, 2015

(86) PCT No.: PCT/EP2015/075790
§ 371 (c)(1),
(2) Date: May 3, 2017

(87) PCT Pub. No.: WO2016/071436
PCT Pub. Date: May 12, 2016

(65) Prior Publication Data
US 2017/0313187 A1    Nov. 2, 2017

(30) Foreign Application Priority Data
Nov. 6, 2014    (DE) .......................... 10 2014 016 451

(51) Int. Cl.
*B60K 23/08*    (2006.01)
*F16H 48/30*    (2012.01)

(52) U.S. Cl.
CPC ............ *B60K 23/08* (2013.01); *B60K 17/352* (2013.01); *B60K 2023/0833* (2013.01);
(Continued)

(58) Field of Classification Search
CPC .............................. B60K 23/08; B60K 17/352
(Continued)

(56) References Cited

U.S. PATENT DOCUMENTS 6,131,686 A * 10/2000 Scotti .................. B60K 17/34
180/245
6,725,992 B1    4/2004 Ray et al.
(Continued)

FOREIGN PATENT DOCUMENTS

CN    1496885 A    5/2004
CN    102910170 A    2/2013
(Continued)

OTHER PUBLICATIONS

German Examination Report issued in corresponding DE 10 2014 016 451.9 dated Jul. 2, 2015; 5pgs.
(Continued)

*Primary Examiner* — Jacob D Knutson
(74) *Attorney, Agent, or Firm* — Maier & Maier, PLLC

(57) ABSTRACT

A device and a method for operating a multi-axle drive train for a motor vehicle. A first axle and a second axle are operatively connected, at least temporarily, to a drive device. When the second axle is decoupled from the drive device and a request for multi-axle drive with a first value is present, the second axle is coupled to the drive device only when a noise-masking event occurs, or when the second axle is coupled to the drive device and the request for multi-axle drive is absent, the second axle is decoupled from the drive device only when the noise-masking event occurs.

7 Claims, 1 Drawing Sheet

(52) U.S. Cl.
CPC ............ *B60K 2023/0841* (2013.01); *B60K 2023/0858* (2013.01); *B60K 2023/0883* (2013.01); *B60Y 2306/09* (2013.01); *B60Y 2400/421* (2013.01)

(58) Field of Classification Search
USPC ........................................... 180/247
See application file for complete search history.

(56) References Cited

U.S. PATENT DOCUMENTS

| | | | |
|---|---|---|---|
| 2004/0064233 A1 | 4/2004 | Iida | |
| 2013/0311040 A1* | 11/2013 | Hasegawa | F16F 7/1011 701/36 |
| 2014/0067217 A1* | 3/2014 | Stares | B60K 23/0808 701/69 |
| 2015/0219170 A1* | 8/2015 | Brooks | B60K 17/02 475/225 |

FOREIGN PATENT DOCUMENTS

| | | | |
|---|---|---|---|
| DE | 10101347 A1 | 8/2002 | |
| DE | 102010039445 A1 | 2/2012 | |
| DE | 102011084220 A1 | 4/2012 | |
| JP | 2016078647 A * | 5/2016 | ........... B60K 17/354 |
| WO | 2010017882 A1 | 2/2012 | |

OTHER PUBLICATIONS

International Search Report issued in corresponding PCT/EP2015/075790 dated Feb. 16, 2016; 4pgs.

Translation of the International Preliminary Report on Patentability dated May 18, 2017, in connection with corresponding International Application No. PCT/EP2015/075790 (7 pgs.).

Chinese Office Action dated Oct. 29, 2018, in connection with corresponding CN Application No. 201580060268.7 (21 pgs., including machine-generated English translation).

* cited by examiner

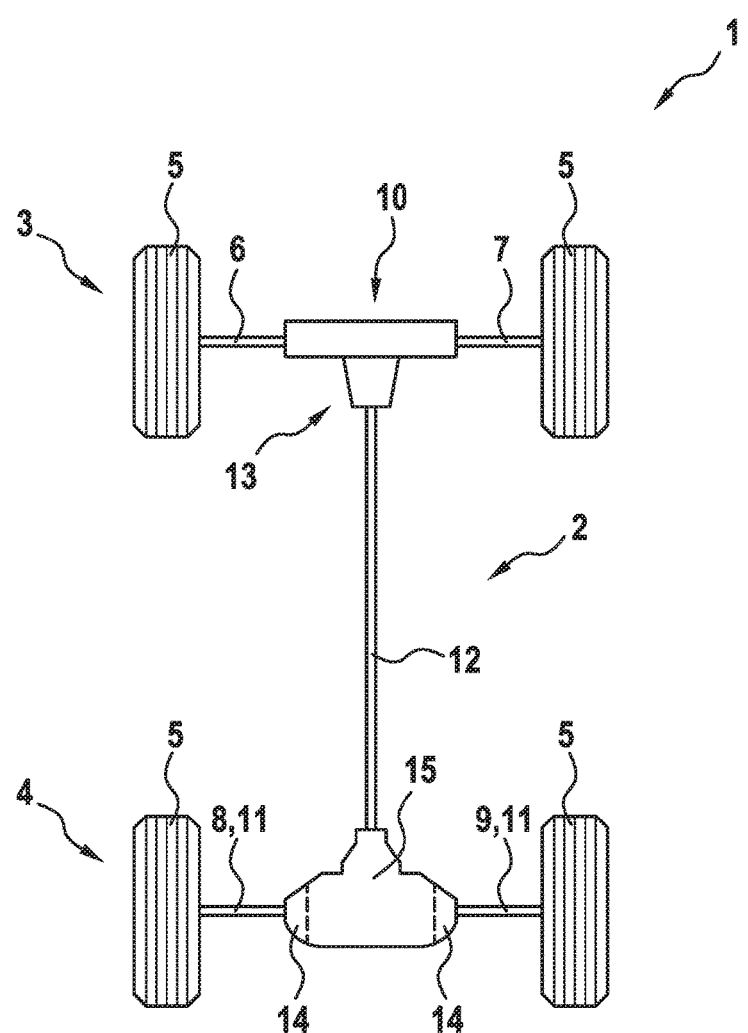

METHOD FOR OPERATING A MULTI-AXLE DRIVE TRAIN FOR A MOTOR VEHICLE, AND CORRESPONDING MULTI-AXLE DRIVE TRAIN

FIELD

The invention relates to a method for operating a multi-axle drive train for a motor vehicle, with a first axle being operatively connected permanently and a second axle being operatively connected at least temporarily to a drive device. In addition, the invention relates to a multi-axle drive train for a motor vehicle.

BACKGROUND

The multi-axle drive train can be used, for example, for a motor vehicle, and in particular, can be a component of the motor vehicle. The multi-axle drive train makes possible the driving of a plurality of axles, for example, the first axle, in particular a front axle, and the second axle, in particular a rear axle, of the motor vehicle. An operative connection between the axles of the motor vehicle in this case can be produced via the connecting shaft, which is present as a Cardan or universal shaft, for example. It is frequently desired that a multi-axle operation is conducted by means of the multi-axle drive train only temporarily, during which time a plurality of the axles are actually driven. In the case of the motor vehicle, this is necessary, for example, only when the traction would be too small for driving only one of the axles, and/or when the desired driving performance can only be realized with multi-axle drive. Therefore, it is frequently of interest to drive only one of the axles, namely the first axle, by means of the multi-axle drive train.

SUMMARY OF THE DISCLOSURE

It is now the object of the invention to propose a method for operating a multi-axle drive train that has advantages when compared with the prior art, and in particular, improves the travel comfort of the motor vehicle.

In this case, it is provided that when the second axle is decoupled from the drive device, and a request for multi-axle drive with a first value is present, the second axle is coupled, in particular completely coupled, to the drive device only when a noise-masking event occurs, or in that, when the second axle is coupled with the drive device and a request for multi-axle drive is absent, the second axle is decoupled from the drive device only when the noise-masking event occurs.

The request for multi-axle drive is triggered, for example, by a control device of the multi-axle drive train or of the motor vehicle, in particular when it has the first value. Preferably, the request for multi-axle drive can have different values, wherein, for example, a higher value of the request for multi-axle drive describes a greater urgency for coupling the second axle at the drive device or coupling the second axle to the drive device. The coupling or decoupling can be carried out in a single step or in several steps. For example, the coupling or decoupling will be carried out insofar as this is possible without coupling noise or only with coupling noise of low intensity. First, a step that produces coupling noise at a specific intensity is delayed until the noise-masking event occurs. For purposes of simplicity, the noise produced by coupling and decoupling is designated as coupling noise in each case, although for the latter, the designation decoupling noise can also be used.

If the drive device is decoupled from the second axle, and in this state of the multi-axle drive train, the request for multi-axle drive with the first value occurs, then in fact, the second axle is to be coupled basically to the drive device. However, this is carried out only when the noise-masking event occurs. In particular, the coupling of the second axle to the drive device is thus carried out during the noise-masking event. In this respect, it is particularly preferred if coupling is only carried out if the noise-masking event has a corresponding length or a noise-masking event of suitable length occurs. These details can be drawn on analogously for decoupling. The decoupling is to be carried out if the second axle is coupled to the drive device at this time, but multi-axle operation is not (or no longer) desired and correspondingly the request for multi-axle drive becomes unnecessary or has already become unnecessary.

The noise-masking event represents, for example, the occurrence of a masking noise, which at least partially masks, but in particular completely masks, a noise produced by the coupling of the second axle to the drive device and/or a noise produced from decoupling the second axle from the drive device. It is understood by this that the noise-masking event prevents the driver or passengers in the motor vehicle from perceiving as disturbing the coupling noise produced by the coupling and/or decoupling.

For example, the noise-masking event has a masking noise that is louder than the coupling noise. Additionally or alternatively, the noise of the noise-masking event can be present in a frequency range that prevents or at least attenuates a separate perception of the coupling noise by the passengers of the motor vehicle. In this case, for example, the acoustic effect of masking or concealing from human hearing is utilized, as this is also employed in the case of the MPEG-2 Audio Layer III audio compression method.

In another embodiment of the invention, it is provided that the coupling of the second axle to the drive device and/or the decoupling of the second axle from the drive device will be delayed until the noise-masking event is present. This was already essentially expressed by the above details. Even in the presence of the request for multi-axle drive, in particular with the first value, the first axle is thus not directly coupled to the drive device when the request for multi-axle drive occurs. Analogously, the decoupling is not carried out directly after the elimination of the request for multi-axle drive. Rather, the coupling or the complete coupling and/or the decoupling or the complete decoupling is (are) delayed until the noise-masking event is present or occurs. In particular, the coupling and/or decoupling does (do) not take place directly at the beginning of the noise-masking event, but only after the beginning of the noise-masking event, thus during the noise-masking event.

It can thus be provided that the coupling of the second axle to the drive device takes place only in a time-delayed manner after the occurrence of the noise-masking event. Due to the time delay, which can be selected as a function of the type of noise-masking event, a reliable masking of the coupling noise can be ensured by the masking noise.

An enhancement of the invention provides that the noise-masking event is an operating state of the motor vehicle, a change in the operating state of the motor vehicle, in particular of a vehicle assembly, an operation of the driver, and/or an environmental influence. In order to establish the operating state and in this regard the noise-masking event, preferably at least one state variable and/or operating value is drawn upon. In particular, the operating state is present when the travel speed of the motor vehicle exceeds a certain speed, and/or when the rotational speed of the drive device is greater than a specific rotational speed. As a state variable, for example, the degree of opening of at least one closure in the vehicle, in particular a side window and/or a sun roof, is taken. As soon as the degree of opening indicates a closure has been opened in the vehicle, the noise-masking event is preferably present.

Alternatively or additionally, the motor vehicle or the vehicle assembly can produce the masking noise of the noise-masking event during a change in the operating state. For example, a gearbox (transmission) or a windshield wiper is employed as the vehicle assembly. The change in the operating state in the case of the transmission, for example, can be a shift in gear or the activation of a coasting shift; in the case of the windshield wiper, the change can be, for example, a change in direction of the wiper blades. An impact on the gas (pedal) or a clutch process, in particular a starting clutch, brought about by the driver, can also be used as a change in operating state. The masking noise, however, can also be a noise generated by a driver assistance device or a multimedia device. Alternatively or additionally, however, the impact on the gas (pedal) or the clutch process can also be associated with an operation of the driver by which the noise-masking event is present.

Additionally or alternatively, of course, an environmental influence can be drawn on as the noise-masking event. Such an effect, for example, is caused by bumps in the road and/or other uneven ground surface. In the case of the environmental influence, preferably a periodicity of the environmental influence or of a masking noise produced by it will be determined. The coupling of the second axle to the drive device or the decoupling will be subsequently synchronized corresponding to the periodicity with the masking noise. For example, the coupling and/or decoupling will be carried out at a time point when the next periodic masking noise most likely occurs.

In a preferred embodiment, it is provided that the presence of the environmental influence is determined by means of a sensor associated with a shock absorber. The sensor is, for example, a travel sensor, in particular a travel sensor for a spring. The current spring travel of the shock absorber can be determined with the aid of the sensor and the periodicity of the masking noise or the next occurrence of the noise-masking event can be concluded from the temporal profile of the travel of the spring.

In a preferred embodiment of the invention, it can be provided that the operation is established by means of an operating element, in particular an operating pedal. The operating pedal is, for example, a gas pedal, a brake pedal, or a clutch pedal. Of course, several, in particular all, of the named operating elements can be present and can be monitored corresponding to different operations for which a noise-masking event occurs in each case.

In another preferred embodiment of the invention, it is provided that the multi-drive request is pre-controlled, having been determined from at least one operating variable of the multi-axle drive train. Thus, in particular, the request for multi-axle drive is to occur not only reactively when too great a slippage has already occurred between wheels of the first axle and the ground below the motor vehicle. Rather, based on the operating variable of the multi-drive train, any possibly occurring slippage can be predicted and can be clearly determined prior to the request for multi-drive, and in particular, the request is set at the first value. Correspondingly, sufficient time is available in order to actually wait for the noise-masking event for the coupling or decoupling of the second axle to the drive device.

In another embodiment of the invention it is provided that a travel speed, an acceleration, an inclination of the ground, and/or a state variable of the drive device will be used as operating variable. Basically, any of the named variables, particularly also several of the named variables, or all of the named variables can be introduced into the determination of the request for multi-drive.

A preferred embodiment of the invention provides that when the request for multi-axle drive is present with a second value, the second axle will be immediately coupled to the drive device. As already explained above, the request for multi-axle drive can have different values, which reflect the urgency of the request for multi-axle drive. In the case of the first value, one can wait for the occurrence of the noise-masking event without anything further, without endangering the driving stability and/or the driving safety of the motor vehicle. However, if the request for multi-axle drive occurs with the second value, then the second axle must be immediately coupled to the drive device. The request for multi-axle drive occurs with the second value, for example, when slippage has already occurred between at least one wheel of the first axle and the ground below the motor vehicle. The second value is preferably greater than the first value.

A preferred embodiment of the invention provides that the request for multi-axle drive is set at the second value when slippage has been established, and/or slippage is to be expected based on the operating variable, and/or an increase in drive power is requested. The request for multi-axle drive can thus assume the second value under different conditions. For example, as already established, with occurrence of slippage. Alternatively or additionally, the expected occurrence of slippage is already sufficient, whereby for this purpose, the operating variable is evaluated according to the above details. An increase in the drive power, thus of the power provided by the drive device, can also lead to the occurrence of the request for multi-axle drive with the second value.

The invention further relates to a multi-axle drive train for a motor vehicle, in particular, for implementing the method explained above, with one axle being operatively connected permanently and a second axle being operatively connected at least temporarily to a drive device. In this case, it is provided that when the second axle is decoupled from the drive device and a request for multi-axle drive with a first value is present, the multi-axle drive train is designed for the purpose of coupling the second axle to the drive device only when a noise-masking event occurs, or when the second axle is coupled to the drive device and a request for multi-axle drive is absent, of decoupling the second axle from the drive device only when the noise-masking event occurs.

The advantages of such a procedure or of such an embodiment of the multi-axle drive train have already been entered into in detail. Both the multi-axle drive train as well as the method can be enhanced according to the preceding details, so that reference is made thereto in this regard.

BRIEF DESCRIPTION OF THE DRAWING

The invention will be explained in further detail in the following on the basis of the exemplary embodiments shown in the drawing, without resulting in any limitation of the invention. The single FIGURE shows:

The FIGURE is a schematic representation of a multi-axle drive train for a motor vehicle.

DETAILED DESCRIPTION

The FIGURE illustrates a multi-axle drive train 1 for a motor vehicle, which is not shown in further detail. The multi-axle drive train 1 provides a multi-axle drive device 2, which serves for alternative operation of only a first axle 3 or of the first axle 3 and a second axle 4. In the example of embodiment shown here, each of the axles 3 and 4 provides two wheels 5, which are arranged on axle members 6 and 7 of the first axle 3 and axle members 8 and 9 of the second axle 4. It can now be provided that the axle members 6 and 7 of the first axle 3 form a first output shaft 10. More preferably, however, they are connected to the first output shaft 10 via a differential gear, particularly an axle differential gear; thus, in particular, they are operatively connected rigidly and/or permanently to it. Each of the axle members 8 and 9 may be present as a second output shaft 11. Alternatively, it can be provided that the axle members 8 and 9 are connected to the second output shaft 11 via a differential gear, in particular, an axle differential gear.

The multi-axle drive device 2 provides a connecting shaft 12, which can produce an operative connection between the first axle 3 and the second axle 4. The connecting shaft 12 is preferably designed as a Cardan or universal shaft. A synchronizing clutch 13 is arranged between the first output shaft 10 and the connecting shaft 12 in an operative connection. The synchronizing clutch 13 is preferably designed as a force-locking clutch. It makes possible, in particular, the transmission of any portion of the applied torque. A separating clutch 14 is also arranged between the connecting shaft 12 and the second output shaft 11 in an operative connection. In the exemplary embodiment shown here, in this regard, two separating clutches 14 are present, whereby in each case, one of the separating clutches 14 is arranged between a differential gear 15 and one of the two second output shafts 11 or the axle members 8 and 9.

The connecting shaft 12 in this case is operatively connected rigidly and/or permanently to the differential gear 15. The operative connection between the differential gear 15 and hence the connecting shaft 12, on the one hand, and the second output shafts 11 in the form of axle members 8 and 9, on the other hand, can be alternatively made or broken with the help of the separating clutch 14.

Preferably, the separating clutches 14 are always found in the same position, so that either an operative connection between the connecting shaft 12, on the one hand, and axle members 8 and 9, on the other hand, is enabled or is disabled.

In a first operating state of the multi-axle drive device 2, the synchronizing clutch 13 and the separating clutch 14 are disengaged, so that the operative connection between the first output shaft 10 and the second output shaft 11 is disabled. Even if only one separating clutch 14 or one second output shaft 11 is mentioned below, in the scope of the present exemplary embodiment, both output shafts 11 or both separating clutches 14 are always meant. In a second operating state, the synchronizing clutch 13 and the separating clutch 14 are completely engaged. The separating clutch 14 is preferably designed as a form-locking clutch, in particular as a dog clutch.

In the scope of the multi-axle drive train 1 presented here, the first axle 3 is operatively connected to a drive device, which is not shown here, or is driven by this device. The second axle, in contrast, is only temporarily operatively connected to the drive device via a shift clutch and is driven by it. The shift clutch can be represented by the synchronizing clutch 13 and/or the separating clutches 14. It is only important in this case that the operative connection between the drive device and the second drive shaft 11 can be disabled with the shift clutch.

The multi-axle drive train 1 is now operated in such a way that when the second axle 4 is decoupled from the drive device and a request for multi-axle drive with a first value is present, the second axle 4 is coupled to the drive device only when a noise-masking event occurs, or that when the second axle 4 is coupled to the drive device and a request for multi-axle drive is absent, the second axle is decoupled from the drive device only when the noise-masking event occurs. A noise-masking event is understood to be an event, in the scope of which a masking noise occurs. In this case, the masking noise is suitable for the purpose of acoustically masking at least partially, but particularly completely, a coupling noise that arises by coupling or by decoupling the second axle 4 to or from the drive device.

The invention claimed is:

1. A method for operating a multi-axle drive train for a motor vehicle, comprising:
    providing a first axle and a second axle being operatively connected at least temporarily to a drive device, wherein, when the second axle is decoupled from the drive device and a request for multi-axle drive with a first value is present, the second axle is coupled to the drive device only when a noise-masking event occurs, and when the second axle is coupled to the drive device and the request for multi-axle drive is absent, the second axle is decoupled from the drive device only when the noise-masking event occurs.

2. The method according to claim 1, wherein the coupling of the second axle to the drive device and the decoupling of the second axle from the drive device will be delayed until the noise-masking event is present.

3. The method according to claim 1, wherein the noise-masking event is at least one of an operating state of the motor vehicle, a change in the operating state of the motor vehicle, an operation of the driver, and an environmental influence.

4. The method according to claim 1, wherein the request for multi-axle drive is pre-controlled, having been determined from at least one operating variable of the multi-axle drive train.

5. The method according to claim 4, wherein a travel speed, an acceleration, an inclination of the ground, and a state variable of a drive device is used as the at least one operating variable.

6. The method according to claim 1, wherein when the request for multi-axle drive with a second value is present, the second axle is immediately coupled to the drive device.

7. The method according to claim 6, wherein the request for multi-axle drive is set at the second value when a slippage is established, and slippage is to be expected based on an operating variable, and an increase in drive power is requested.

* * * * *